Feb. 13, 1934. M. AMANN 1,946,891
EQUIPMENT FOR SUPPLYING CURRENT IMPULSES
Filed July 8, 1932
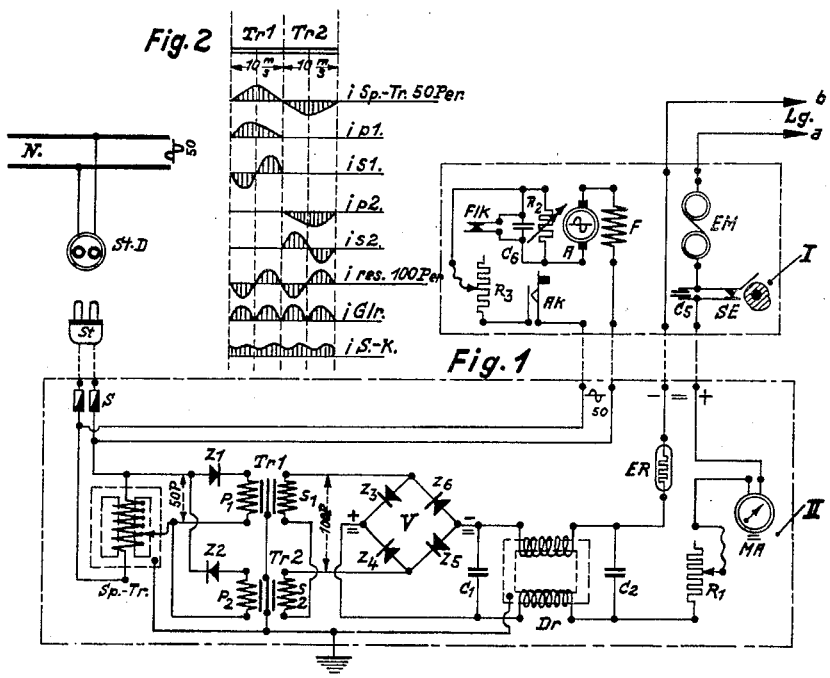
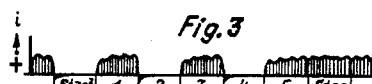
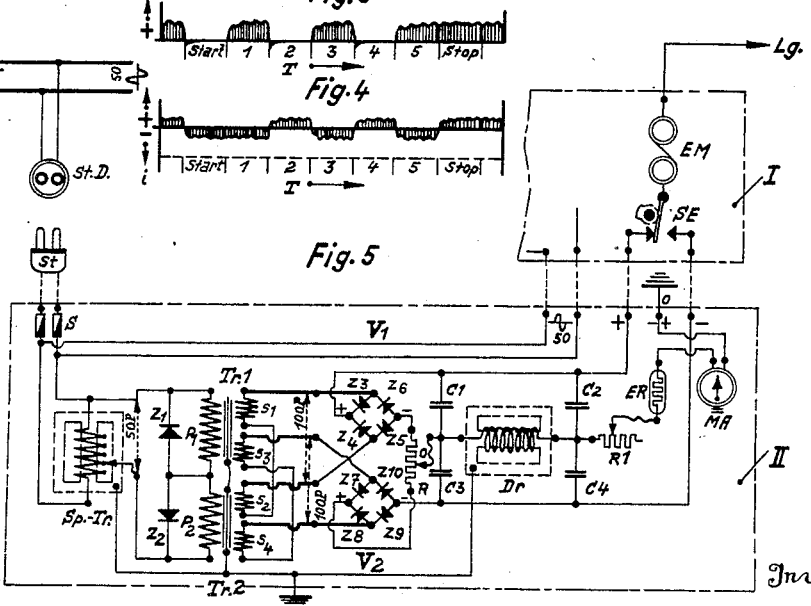
Inventor
MAX AMANN
By Dowell & Dowell
Attorneys Patented Feb. 13, 1934

1,946,891

UNITED STATES PATENT OFFICE 1,946,891

EQUIPMENT FOR SUPPLYING CURRENT IMPULSES

Max Amann, Frankfort-on-the-Main, Germany

Application July 8, 1932. Serial No. 621,503, and in Germany July 8, 1931

8 Claims. (Cl. 178—2)

This invention relates to current impulse transmitters and receivers.

In motor driven current impulse senders or receivers such as used for example in printing telegraph apparatus and electrical typewriting machines and the like, it may be possible to provide at the sender or receiver a local current source which supplies direct current for transmitting the current impulses, either for sending over a connecting line or for controlling the receiver magnet. Difficulties however occur in these apparatus when only a single phase alternating current main is used as the current source. It has therefore been suggested that a rotary converter be used as a local current source. But this increases the use of rotary apparatus as the converters cannot be connected with the current impulse sender or receiver, and thus the mobility of the apparatus is reduced. It has also been proposed to use rectifiers and to construct the drive motor as a direct current motor, but as rectifiers do not operate with sufficient efficiency, the total efficiency of the drive is considerably reduced when the motor is connected to the rectifier. Furthermore, known arrangements have proved defective in that for a given size of rectifier the variations of load on the drive exert an action on the intensity of the direct current.

With the ordinary rectification of the usual 50 cycle alternating currents by means of stationary rectifiers, it is practically impossible to obtain a wholly constant direct current. On the contrary, the direct current always fluctuates in the periods of the alternating current. If the duration of the individual current impulses coincides with the duration of the periods of the main alternating current disturbances in the current impulse transmission may easily arise.

It is of course old to rectify after multiplying the main frequency. The known arrangements for multiplying the frequency operate with supercharged transformers in which the single phase alternating current is first destroyed, so that the desired oscillations can be obtained from this destroyed alternating current. These devices are not however suitable for use with current impulse senders or receivers, as they do not supply the required charge of about 50 watts.

In order to avoid these defects, the present invention proposes to supply the transmitting current by the use of a stationary rectifying apparatus in which the rectifying is done only after multiplying the frequency of the main alternating current by an electro-magnetic conversion of the individual half waves of the alternating current into complete alternating oscillations by means of transformers. In this accomplishment, the drive motor is connected directly to the alternating current main.

Such arrangement or construction has the advantage of avoiding large rotating machines, and enables the rectifier apparatus to be connected with the current impulse sender or receiver in such manner that the entire apparatus is easily transportable.

Further, by reason of the special construction of the rectifier apparatus there is always current of sufficient intensity available for sending and for receiving, which is not always the case when a central battery is used for the sending and receiving circuit as a result of the variable lengths of the individual conductors.

The invention is illustrated by two exemplary connections in the drawing, which show mains connected in installations with telegraph apparatus having single or double current drive.

Figs. 1 and 5 respectively show the circuit arrangement and current course from a main connection for single and double drive.

Fig. 2 is a diagram showing the individual stages of the frequency multiplication and rectification.

Figs. 3 and 4 respectively show the current flow in the sending conductor which occurs when a symbol such for example as the letter T is sent with single and double current drive.

The same reference characters designate corresponding parts in all the figures.

The telegraph instrument I shown in Fig. 1 comprises a sending contact SE, which is actuated by impulses by means of an adjacently represented cam driven by the motor.

The motor of said means having an armature A and field coil F also drives the receiving devices (which are not shown) when the apparatus is used as a receiver. These receiving devices are selectively set by the receiving magnet E. M. The motor is supplied from the alternating current mains N through the socket $St.D$ and the plug $St.$ and through the fuses S. It can be stopped by means of the contact $Ak$. Its speed is set by means of a resistance $R_3$ to receive a number of current impulses equal to 50 per second and is regulated by means of the devices $R_2$ and the centrifugally operated contact $F.lk$.

A mains supply unit II is connected by means of the same plug arrangement and the pair of fuses S. This unit II supplies the direct current voltage for the impulse actuation to the conductors $a$, $b$, forming the line $Lg$.

Preferably, a fifty-cycle alternating voltage is supplied from the auto-transformer $Sp\ Tr$ to the two transformers $Tr_1$ and $Tr_2$. The primary windings $P_1$, $P_2$ of these transformers, however, receive only a half wave of the fifty-cycle alternating current of the mains through the dry rectifiers $Z_1$ and $Z_2$ which are connected in series or in parallel to the said primary windings.

The secondary windings $S_1$ and $S_2$ are also connected in opposition. The alternating voltage induced in the latter produces a current of doubled frequency, which in the case of the present example therefore amounts to 100 periods per second. This current will be rectified in the full wave rectifying device V made up of the rectifiers $Z_3$ to $Z_6$. Smoothing devices are provided consisting of the choke coils $Dr$ and the condensers $C_1$–$C_2$ connected as a filter. The rectified current will be regulated by the resistance $R_1$ and read on the instrument MA. The effects of voltage peaks from the mains N will be automatically neutralized in the iron-hydrogen resistance ER.

The arrangement shown in Figure 5 is for double-current operation. Here the transformers $Tr.1$ and $Tr.2$ each have two secondary windings $S_1$, $S_3$ and $S_2$, $S_4$. The windings $S_1$ and $S_2$ and also $S_3$ and $S_4$ are shown connected in opposition. The full-wave rectifying device here is in the shape of two devices $V_1$ and $V_2$, each consisting of four rectifiers $Z_3$ to $Z_6$ and $Z_7$ to $Z_{10}$. The point O in the resistance R which is connected between the rectifying arrangements $V_1$ and $V_2$ so as to connect them in series, is at zero potential. The choke coil $Dr$ in this instance, having condensers $C_1$ to $C_4$, the regulating resistance $R_1$ and the iron resistance ER are inserted in the middle wire. The iron parts of the transformers and choke coils are grounded in the usual way.

The conditions during the frequency multiplication and the rectification are represented in Figure 2. The positive half-wave of the mains current I as it leaves the auto-transformer $Sp$ $Tr$ is effective in the winding $P_1$ of the transformer $Tr_1$. The alternating voltage induced in the secondary winding $S_1$ of this transformer produces the alternating current $iS_1$ as shown in Figure 2. Likewise, the negative half-wave effective in the winding $P_2$ of the transformer $Tr_2$ produces the current $iS_2$ in the secondary winding $S_2$. By connecting in the correct sense the currents flowing in the secondary windings, the current curve $i$ res. is obtained with a doubled frequency namely one hundred periods per second. By full wave rectification, the curve $i$ Glr can be obtained which is smoothed by the filter and acquires the shape $i$ SK.

Accordingly, the telegraphing speed of fifty impulses per second is obtained and now two periods (four alternations) of the rectified hundred-cycle alternating current can be used for each current impulse. The current diagram illustrated in Figures 3 and 4 and obtained in this manner, shows that the shape of the current impulses is assimilated to a high degree to the usual characteristics when employing direct current (single or double current).

The mains unit is preferably built from constructional units and carries besides the connections for the supply of current impulse apparatus, also connections for the driving motor and other mains fed auxiliary devices.

I claim:

1. An impulse apparatus, comprising in combination with alternating current conductor mains, a driving motor adapted to be connected directly with said mains, means for multiplying the frequency of the current from said mains, and means for rectifying the current after the multiplication of its frequency; said rectifying means producing direct current for the impulses.

2. An impulse apparatus, comprising in combination with conductor mains of alternating current, means for multiplying the frequency of the current from said mains; said means consisting of rectifiers and transformers so related as to transpose each half wave of alternating current to one period of an alternating current of the double frequency.

3. An impulse apparatus for double current impulses, comprising in combination with conductor mains of alternating current, two devices for multiplying the frequency of the current from said mains, and two devices for rectifying the current after multiplication of its frequency; each of the rectifying devices being arranged with a frequency multiplication device, and the output circuit of the two rectifying devices being connected in series.

4. An impulse apparatus for double current impulses, comprising in combination with conductor mains of alternating current, means for multiplying the frequency of the current from said mains, said means consisting of two rectifiers and two transformers; each transformer being adapted to transpose one half wave of alternating current to one period of alternating current of the double frequency and each transformer having two secondary windings and two devices for rectifying the alternating current after its multiplication; and each of said rectifying devices being connected to two windings, one on the secondary side of one of the transformers and the other on the secondary side of the other transformer, and the two windings being joined together.

5. An impulse apparatus for double current impulses, comprising in combination with alternating current conductor mains, a driving motor adapted to be connected directly to said mains; means for multiplying the frequency of the current from the mains, said means consisting of two rectifiers and two transformers, each transformer being adapted to transpose one half wave of alternating current to one period of alternating current of the double frequency and each having two secondary windings; and two devices for rectifying the alternating current after its multiplication, each of said rectifying devices being connected to two windings, one on the secondary side of one of the transformers and the other on the secondary side of the other transformer, and the two windings being joined together.

6. An apparatus for single or double current impulsing according to claim 1 embodying rectifying means constructed as a full-wave rectifier.

7. An impulse apparatus according to claim 1, wherein is included a plurality of devices for multiplying the frequency of the current from the mains connected successively in series.

8. An apparatus for single or double current impulse generation, comprising in combination with alternating current conductor mains, a driving motor adapted to be connected directly to said mains; means for multiplying the frequency of the current from the mains; means for rectifying the current after the multiplication of its frequency, said rectifying means producing direct current for impulses; and means for connecting the input circuit of said frequency multiplying means to the conductor mains, said driving motor being connected to said connecting means.

MAX AMANN.